June 8, 1937.  L. J. LARSON  2,083,234
METHOD OF WELDING
Filed April 4, 1936

INVENTOR.
Louis J. Larson
BY
ATTORNEY.

Patented June 8, 1937

2,083,234

UNITED STATES PATENT OFFICE 2,083,234

METHOD OF WELDING

Louis J. Larson, Milwaukee, Wis., assignor to A. O. Smith Corporation, Milwaukee, Wis., a corporation of New York Application April 4, 1936, Serial No. 72,682

9 Claims. (Cl. 219—10)

This invention relates to a method of welding, and more particularly to a method of welding seams in alloy sheets used to provide a special surface on plates of steel or alloys of a different composition.

The invention is useful in connection with the fabrication of lined pressure vessels such as are used in the oil refining and the chemical industries. One form of construction which is generally practiced in fabricating such vessels is to electrically spot weld liner sheets to steel plates and to then bend the steel plates with the attached liner into proper shapes for welding together to form a vessel. Such a method of construction is described in U. S. Letters Patent No. 1,840,305 issued on January 12, 1932 to O. E. Andrus and Sune Hermanson for Oil refining still. It will be seen that with such a method of construction the welding together of different sections to form a complete vessel will require a weld between the edges of adjacent liner sheets where a weld is also required between the steel plates to which the liner sheets are attached. The present invention is of particular utility in connection with this method of construction, but is not limited thereto since it may also be advantageously employed in connection with other methods of fabricating lined vessels.

One of the problems encountered in the fabrication of lined vessels is that of providing a weld at the seam between adjacent liner sheets which will have characteristics as to corrosion resistance similar to those of the liner sheets. This problem arises because in the fabrication of the vessel it is generally necessary to leave a space between the edges of adjacent liner sheets. This is particularly true with the method described in the patent above referred to since when the liner sheets are secured to the steel plates before these are bent into shape and welded together to form the completed vessel, it is generally desirable to terminate the liner sheets some distance short of the edges of the steel plates to which they are attached in order to leave a space in which the steel plates can be welded together. Even when liner sheets are applied to the interior of a vessel formed of steel sections previously welded together, it will be desirable to have a small space left between the edges of adjoining liner sheets in order that a firm union of the liner to the vessel may be secured along the line of the seam. In either case a space is left between the edges of the liner sheets forming a groove in which the bottom is formed of the plain carbon steel wall of the vessel while the sides are formed of the edges of the liner sheet. When fused metal having the composition of the liner sheets is flowed into this groove to unite the liner sheets and the carbon steel wall, some of the carbon steel forming the bottom of the groove is melted and mixed with the fused metal deposited in the groove. Since the carbon steel does not have the same alloy content as the liner sheets it dilutes the deposited metal and results in a weld which is of lower alloy content and of lower corrosion resistance than the alloy liner sheets.

An object of this invention is to provide an improved method for producing a weld between liner sheets where a weld between the steel plates carrying the liner sheets is also necessary.

Other objects of the invention will be clear from the following description and accompanying drawing in which.

Figure 1:
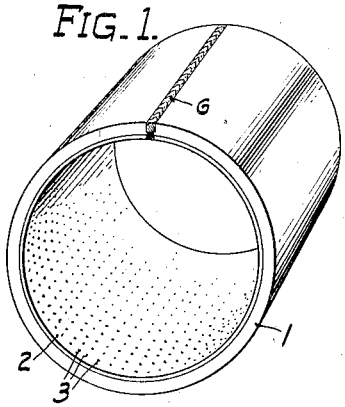
Figure 1 is a perspective view of a cylindrical ring section of a vessel with an alloy liner sheet secured to the inside.
Figure 2:
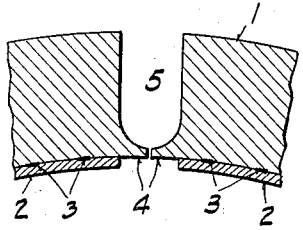
Fig. 2 is a section through the longitudinal seam in the ring section showing the welding groove ready for the deposition of carbon steel weld metal to weld the steel plates together.
Figure 3:
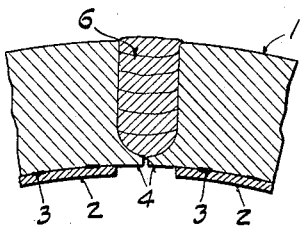
Fig. 3 is a section through a longitudinal seam after the welding groove shown in the preceding figure has been filled with deposited weld metal.
Figure 4:
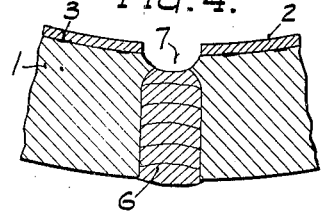
Fig. 4 is a section through a partially welded longitudinal seam in a ring section turned so as to place the seam at the bottom of the ring section.
Figure 5:
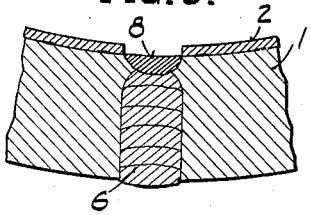
Fig. 5 shows a section through the weld at a later stage.
Figure 6:
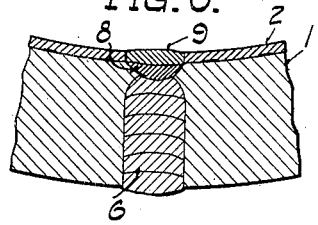
Fig. 6 shows a section through the completed weld.
Figure 7:
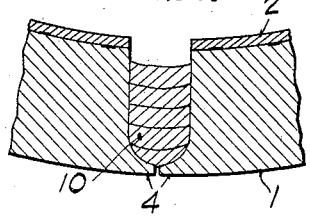
Fig. 7 shows a section through a longitudinal seam arranged for welding by a modification of the invention.
Figure 8:
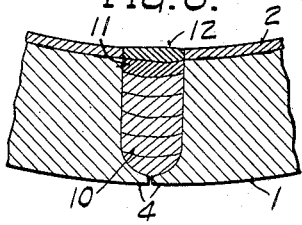
Fig. 8 shows a section through a completed weld made by the modified procedure of Fig. 7.

Referring to the drawing, Figs. 1 to 6 inclusive illustrate one embodiment of the process as applied to the welding together of steel plates to one side of which a corrosion-resistant liner sheet is firmly bonded; Figs. 7 and 8 another embodiment for the welding together of similar plates; and Figs. 9 to 12 inclusive, embodiments suitable for joining together steel plates to which liner sheets are to be later applied with the seams between adjacent liner sheets falling over welds between the steel plates. The invention is specifically illustrated in connection with the welding of longitudinal seams in ring sections to be welded together to form a completed vessel but is equally applicable to the welding of the circumferential seams of vessels or of seams in flat or otherwise shaped plates.

In the embodiments illustrated in the drawing, the ring section is formed of a steel plate 1 rolled or bent into the desired shape. The liner sheet 2 is securely bonded to the steel plate by any suitable method. One convenient method is by electrically spot welding the two together at closely spaced spots 3. The steel plate 1 is scarfed at the edges to leave projecting lip edges 4 which form the bottom of a welding groove 5 between two steel plates or between two edges of the same plate which has been so bent as to have two edges adjacent to each other. Molten weld metal is deposited in the welding groove 5 until it is completely filled. Electric arc welding is preferably employed to deposit fused weld metal in the welding groove, but other forms of fusion welding may be used if desired. The weld metal is desirably deposited from a fusible metallic electrode having a composition similar to that of the steel plate 1, and is preferably laid down in a number of layers 6. The lip edges 4 are then burned or chipped out and the ring section is turned so as to have the position indicated in Fig. 4.

Groove 7 is next partially filled with weld metal deposited from a fusible metallic electrode having a composition similar to that of the liner sheets. The top of the layer 8 of metal so deposited is desirably made to be substantially flush with the junction between steel plate 1 and liner sheet 2. This layer of metal will have an alloy content somewhat less than that of the alloy weldrod from which it is deposited due to dilution with material from the plate 1. The weld is then completed by depositing another layer 9 of weld metal from a weldrod having substantially the same composition as the liner sheets. This layer is deposited in a groove in which the sides are the edges of adjacent alloy sheets while the bottom is the layer 8 of alloy weld metal. Consequently the layer 9 of weld metal will not be sensibly diluted by admixture with material of much lower alloy content and will therefore be of a chemical composition corresponding closely to that of the weldrod from which it is deposited. Since this may be a weldrod having substantially the same chemical composition as the liner sheets it will be seen that the layer 9 will afford substantially the same resistance to corrosion as the liner sheets themselves.

In the modified procedure illustrated in Figs. 7 and 8 the lip edges 4 are provided at the side of the steel plate 1 opposite the side to which the liner sheet 2 is attached. A number of layers 10 of weld metal are then deposited in the welding groove thus formed so as to fill it to within about $\frac{1}{16}$ inch of the top of the steel plate 1. This weld metal is desirably deposited from a metallic weldrod having a chemical composition similar to that of the steel plate. Additional layers of weld metal 11 and 12 are then deposited from a weldrod having a composition similar to that of the liner sheets. The lip edges 4 are burned or chipped out and the weld completed in the same manner as when steel plates alone are welded. Or the burning out of the lips and the filling in of the groove thus formed may be done before layers 11 and 12 are deposited.

Figure 9:
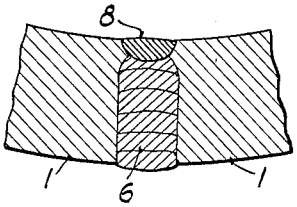
Fig. 9 illustrates a weld in steel plates to which liner sheets are to be later secured as shown in Fig. 10 in such a position that the weld between the liner plates will fall over a weld in the steel plates.
Figure 10:
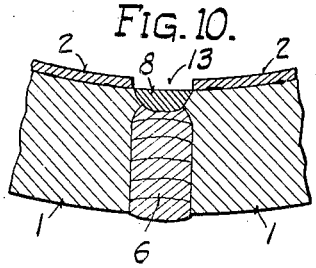
Figure 11:
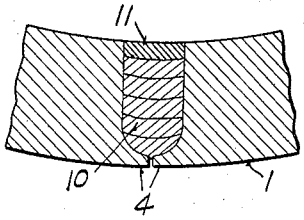
Figs. 11 and 12 illustrate a modified procedure for welding when the liner sheet is applied to the steel plates after these are welded.
Figure 12:
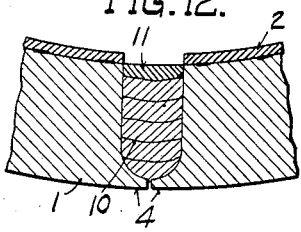

In Fig. 9 the invention is illustrated in connection with welding together steel plates to which liner sheets are to be later secured with seams coming over the welds in the steel plates. The procedure followed is similar to that in the modification illustrated in Figs. 1 to 6 except that the plates do not have any liner sheets secured to them when they are welded together. The weld between the plates will therefore have the appearance shown in Fig. 9 in which 8 is a layer of alloy weld metal. Alloy liner sheets 2 are then secured to steel plates 1 as indicated in Fig. 10, and the weld is completed by filling groove 13 with metal from a weldrod having a composition similar to that of the liner sheets. The completed weld will have the appearance shown in Fig. 6. Figs. 11 and 12 illustrate the modification of Figs. 7 and 8 applied to the joining of steel plates to which liner sheets are later applied.

While the invention has been specifically described in connection with vessels having a lining on the inside it is to be understood that it is not limited thereto. The invention can be used where there is a protective alloy sheet on the outside of the vessel, or also for uniting steel plates which are either before or after welding provided with a protective layer of alloy steel on both sides.

I claim:

1. The method of producing a weld between the edges of a composite structure composed of a metal plate and a sheet of different metal lying against a face of the metal plate, which comprises providing a welding groove between the edges of the metal plate, depositing in said welding groove fused weld metal from a fusible metallic weldrod with a composition similar to that of the metal plate until the groove is partially filled, depositing fused metal from a fusible metallic weldrod with a composition similar to that of the surface sheet to complete the filling of the groove up to about the level of the metal plate on the side adjacent to the surface sheet, and thereafter depositing another layer of weld metal from a fusible weldrod of composition similar to that of the surface sheet to weld the edges of the surface sheet to each other and to the layer of weld metal previously deposited in the groove between the edges of the metal plate.

2. The method of welding together adjacent edges of a composite structure composed of a steel plate and of an alloy sheet in contact with a surface of the steel plate which comprises providing a welding groove between the edges of the steel plate, partially filling said welding groove by depositing fused weld metal from a fusible metallic weldrod with a composition similar to that of the steel plate, depositing fused weld metal from a fusible metallic alloy weldrod with a composition similar to that of the alloy surface sheet to complete the filling of the groove up to about the level of the steel plate on the side adjacent the alloy surface sheet, and thereafter depositing another layer of weld metal from a similar alloy weldrod to weld the edges of the alloy surface sheet to each other and to the layer of alloy weld metal previously deposited in the groove between the edges of the steel plate.

3. In the production of a weld between edges of a composite structure composed of a steel plate and an alloy sheet in contact with a surface of the steel plate, the improvement which comprises partially filling a welding groove between the steel plate edges with weld metal deposited from a fusible metallic weldrod having a composition similar to that of the steel plate, and completing the filling of the welding groove on the side adjacent the alloy surface sheet by depositing weld metal having a composition similar to that of the alloy surface sheet, thereby providing a weld between the edges of the alloy sheet of a depth greater than the thickness of said sheet.

4. The method of making a corrosion-resistant weld between the edges of steel plates faced with a sheet of corrosion-resistant alloy, which comprises providing a welding groove between the steel plates, the bottom of said groove being formed by lips projecting from the steel plate edges adjacent to a surface of the steel plate which is faced with a corrosion-resistant alloy sheet, depositing fused weld metal in said welding groove from a fusible metallic weldrod having a composition similar to that of the steel plate, removing unfused parts of the lips from the opposite side, depositing fused weld metal from an alloy weldrod having a composition similar to that of the alloy sheet until the groove formed by the removal of unfused parts of the lips is filled up to about the level of the surface of the steel plate, and thereafter depositing more fused weld metal from a similar alloy weldrod to weld the edges of the alloy surface sheet to each other and to the previously deposited alloy weld metal.

5. In the welding together of adjacent edges of a composite structure which comprises a steel backing plate and an alloy sheet secured to one face of the steel plate, the steps which comprise providing a welding groove between the edges to be welded together with the bottom of the groove adjacent the face of the steel plate opposite the one to which the alloy sheet is fastened, partially filling said welding groove by depositing fused weld metal in it from a metallic weldrod having a composition similar to that of the steel plate, completing the filling of the groove to about the level of the steel plate by depositing fused weld metal from a fusible alloy weldrod having a composition similar to that of the alloy surface sheet, and thereafter depositing a further quantity of fused weld metal from a similar alloy weldrod so as to weld the edges of the alloy surface sheet to each other and to the previously deposited alloy weld metal.

6. The method of welding together plates to which alloy sheets are to be later secured in such position that there will be a seam between adjacent alloy sheets over a weld between plates, which comprises providing a welding groove between the plate edges to be welded together, partially filling said welding groove with fused weld metal deposited from a weldrod having a composition similar to that of the plates, and completing the filling of the welding groove by depositing fused weld metal from a fusible weldrod having a composition similar to that of the alloy sheets that are to be secured to the plates.

7. The method of welding together plates to which alloy sheets are to be later secured in such position that there will be a seam between adjacent alloy sheets over a weld between plates, which comprises providing between the plate edges to be welded together a welding groove with a bottom formed by lips projecting from the plate edges, depositing fused weld metal in said groove from a weldrod having a composition similar to that of the plates, removing unfused parts of the lips from the opposite side, and depositing in the groove thus formed weld metal from a weldrod having a composition similar to that of the alloy sheets that are to be secured to the plates.

8. In the production of a weld between the edges of a composite structure composed of a steel plate and an alloy sheet in contact with a surface of the steel plate, the improvement which comprises partially filling a welding groove between the steel plate edges with weld metal deposited by electric arc welding from a fusible metallic electrode having a composition similar to that of the steel plate, and completing the filling of the welding groove on the side adjacent the alloy surface sheet by depositing by electric arc welding weld metal having a composition similar to that of the alloy surface sheet, thereby providing a weld between the edges of the alloy sheet of a depth greater than the thickness of said sheet.

9. In the production of a weld between edges of a composite structure composed of a steel plate and a layer of corrosion-resisting metal secured to one surface thereof, the improvement which comprises partially filling a welding groove between the steel plate edges with deposited weld metal having a composition similar to that of the steel plate, and completing the welding of the joint on the side adjacent the layer of corrosion-resisting metal by depositing weld metal having resistance to corrosion similar to that of said layer to provide a deposit of corrosion-resistant weld metal having a substantially greater depth than the thickness of said layer and joining the edges of said layer together.

LOUIS J. LARSON.